(12) United States Patent
Downey et al.

(10) Patent No.: US 6,309,019 B1
(45) Date of Patent: Oct. 30, 2001

(54) FLEX CABLE DRIVE FOR SEAT ADJUSTER ASSEMBLY

(75) Inventors: Hugh D. Downey, Barrie; Pascal Garrido, Gravehurst, both of (CA); Nils O. Olsson, Glen Ellyn, IL (US)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 09/450,197

(22) Filed: Nov. 29, 1999

(51) Int. Cl.$^7$ ................................................... A47C 1/024
(52) U.S. Cl. ......................... 297/344.1; 297/344.13; 297/344.17; 248/421; 248/429
(58) Field of Search .................... 297/440.27, 440.1, 297/344.1, 394.11, 344.13, 344.17; 248/421, 424, 429

(56) References Cited

U.S. PATENT DOCUMENTS

| | | | |
|---|---|---|---|
| 4,880,199 | * 11/1989 | Harney | 248/421 X |
| 5,292,164 | * 3/1994 | Rees | 248/429 X |
| 5,337,995 | * 8/1994 | Satoh et al. | 297/344.17 X |
| 5,483,853 | * 1/1996 | Moradell et al. | 248/429 X |
| 5,816,555 | * 10/1998 | Ito et al. | 248/429 |
| 5,823,499 | * 10/1998 | Ito et al. | 248/429 |
| 6,089,665 | * 7/2000 | Andrigo | 297/344.1 |

* cited by examiner

*Primary Examiner*—Peter M. Cuomo
*Assistant Examiner*—Rodney B. White
(74) *Attorney, Agent, or Firm*—C. R. Kiczek

(57) ABSTRACT

A vehicle seat assembly includes a seat back that is supported with respect to a seat bottom. The seat bottom is supported on a track assembly that includes a seat adjuster for controlling movement of the seat back and bottom. The seat adjuster can move the seat in horizontal and/or vertical directions and can also be used to adjust the tilt of the seat. An electric motor is used to drive the seat adjuster. The motor supports a first connector and the seat adjuster supports a second connector. A flexible shaft is used to interconnect the first and second connectors to transmit power from the motor to the adjuster. The shaft has a first end and a second end with each of the ends defined by a helical body portion. The first connector and the first end are mated to interconnect the motor and the shaft and the second connector and the second end are mated to interconnect the seat adjuster and the shaft. The helical body portion of the first and second ends is twisted with respect to the first and second connectors such that there is a slight interference fit between the ends and the connectors. The use of the helical body to create the interference fit allows for easy assembly of the shaft to the motor and seat adjuster and is quiet in operation.

16 Claims, 3 Drawing Sheets

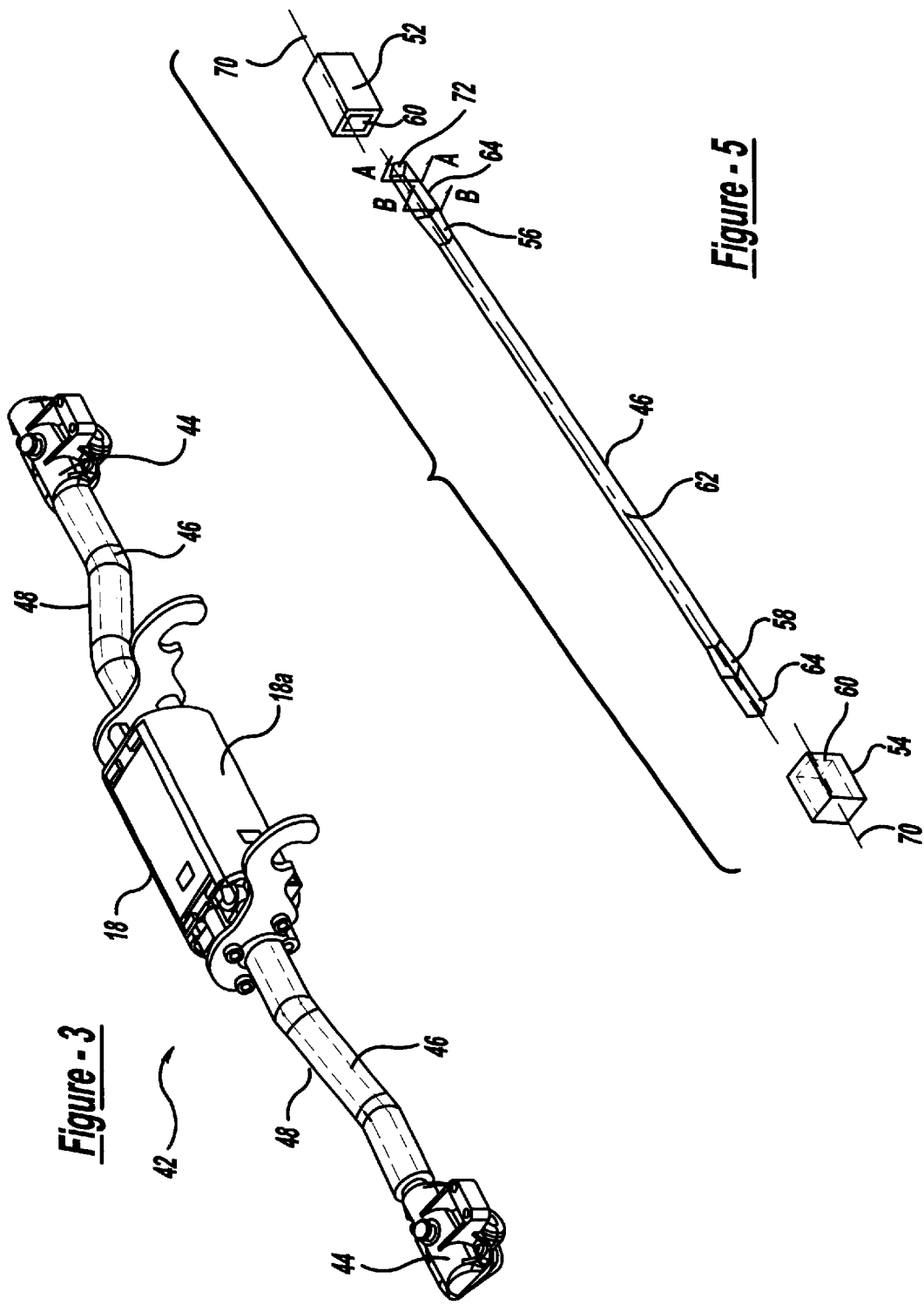

FLEX CABLE DRIVE FOR SEAT ADJUSTER ASSEMBLY

BACKGROUND OF THE INVENTION

This application relates to a shaft used to interconnect a motor and drive mechanism in a seat assembly. Specifically, the shaft includes helical end portions that are twisted with respect to mating connectors to create an interference fit.

Seat adjusters are used to adjust the position of a vehicle seat between various positions. Typically, seat adjusters use electric motors to move a certain seat member between a plurality of positions. The motors are used to power a drive mechanism that is operably connected to the seat member. Most seat adjusters use a flexible shaft or cable to transmit a torsion load from the motor to the drive mechanism. Both ends of the shaft are usually the same to allow for easy assembly of the shaft to the motor and drive mechanism, i.e., assembly of the shaft into the seat adjuster is insensitive to shaft orientation. To further ease assembly, the connectors that receive the ends of the shaft are designed to have the same shape as the ends.

It is common for both ends of the shaft to have a square cross section and for the connectors that receive the ends to have a corresponding square aperture. The shaft ends are typically referred to as male members and the connectors that receive the ends are typically referred to as female members. The square ends of the male members are inserted into the square apertures of the female members to form an interconnect interface. The apertures in the female members are slightly larger than the ends of the male members so that the male members can be easily connected to the female members. The performance of this interface can vary significantly because both the male and female members are square in shape and have respective manufacturing tolerances. Further, because the apertures in the female members are larger than the ends of the male members, there can be looseness between the mating components. This is undesirable because an audible clicking is produced when the shaft is rotating.

Coatings can be used to reduce the clicking noise, however, this adds cost and requires an additional assembly step. Thus, it is desirable to provide an improved interface between the shaft and the connectors for the motor and drive mechanism that eliminates noise during operation. The shaft should also be easily installed onto the motor and drive mechanism and allow for blind assembly.

SUMMARY OF THE INVENTION

A seat adjuster assembly includes an electric motor for powering a drive mechanism. The drive mechanism is used to move a seat member from a first position to a second position. A first connector supported by an output on the electric motor and a second connector is supported by the drive mechanism. A shaft interconnects the electric motor and drive mechanism to transmit power from the motor to the drive mechanism. The shaft includes a first end portion and a second end portion. The first connector and the first end portion are mated together to interconnect the shaft and the motor in an interference fit and the second connector and the second end portion are mated together to interconnect the shaft and the drive mechanism in an interference fit.

Preferably, the first and second connectors are female connectors and the first and second end portions are male members. The female connectors each include a rectangular opening for receiving the male members. The shaft defines a longitudinal axis and the male members include a body having a rectangular cross-section that is twisted about the longitudinal axis. The body has a first section rotated to a first position about the longitudinal axis and a second section rotated to a second position about the longitudinal axis wherein the second position is different than the first position. The twisted body of the male members creates the interference fit when inserted into the female connectors.

Using a shaft with twisted end portions for interconnecting the electric motor and drive mechanism accommodates differences in manufacturing tolerances between the shaft and the connectors. The shaft is easy to assemble into the seat adjuster assembly and is quiet in operation. These and other features can be understood from the following specification and drawings.

BRIEF DESCRIPTION OF THE DRAWINGS

FIG. 3 is a perspective view of the electric motor and drive mechanisms of FIG. 2.

FIG. 5 is an exploded view of the shaft and connectors.

DETAILED DESCRIPTION OF THE PREFERRED EMBODIMENT

Figure 1:
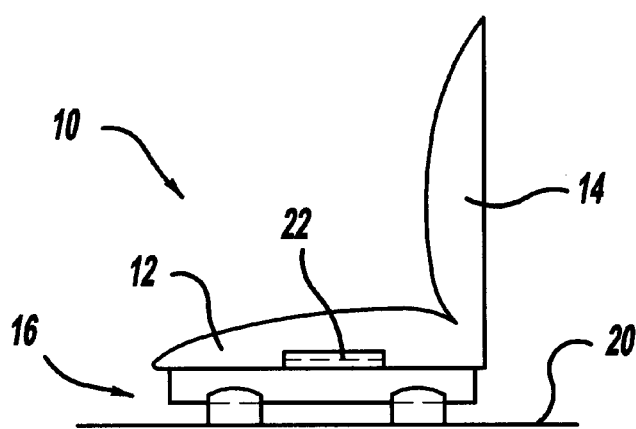
FIG. 1 is a schematic side view of a vehicle seat incorporating the subject seat adjuster assembly.

A vehicle seat assembly 10, shown in FIG. 1, includes a seat bottom 12 and a seat back 14 supported with respect to the seat bottom 12. A seat mounting assembly 16 is used to mount the seat assembly 10 to a vehicle structure 20, such as a floor. A seat adjuster assembly powered by at least one electric motor 18 is used adjust the position of the seat 10. Preferably, one motor 18a is used for horizontal seat adjustment and another motor or pair of motors 18b are used for vertical seat adjustment.

An actuator 22 is selectively operated by a seat occupant to adjust the seat 10 to a desired position. The actuator 22 is preferably comprised a plurality of control levers or buttons, shown schematically in FIG. 1, that are actuated by the seat occupant. The buttons are electrically connected to the motors and provide a signal, as is known in the art, to control the motor operation.

Figure 2:
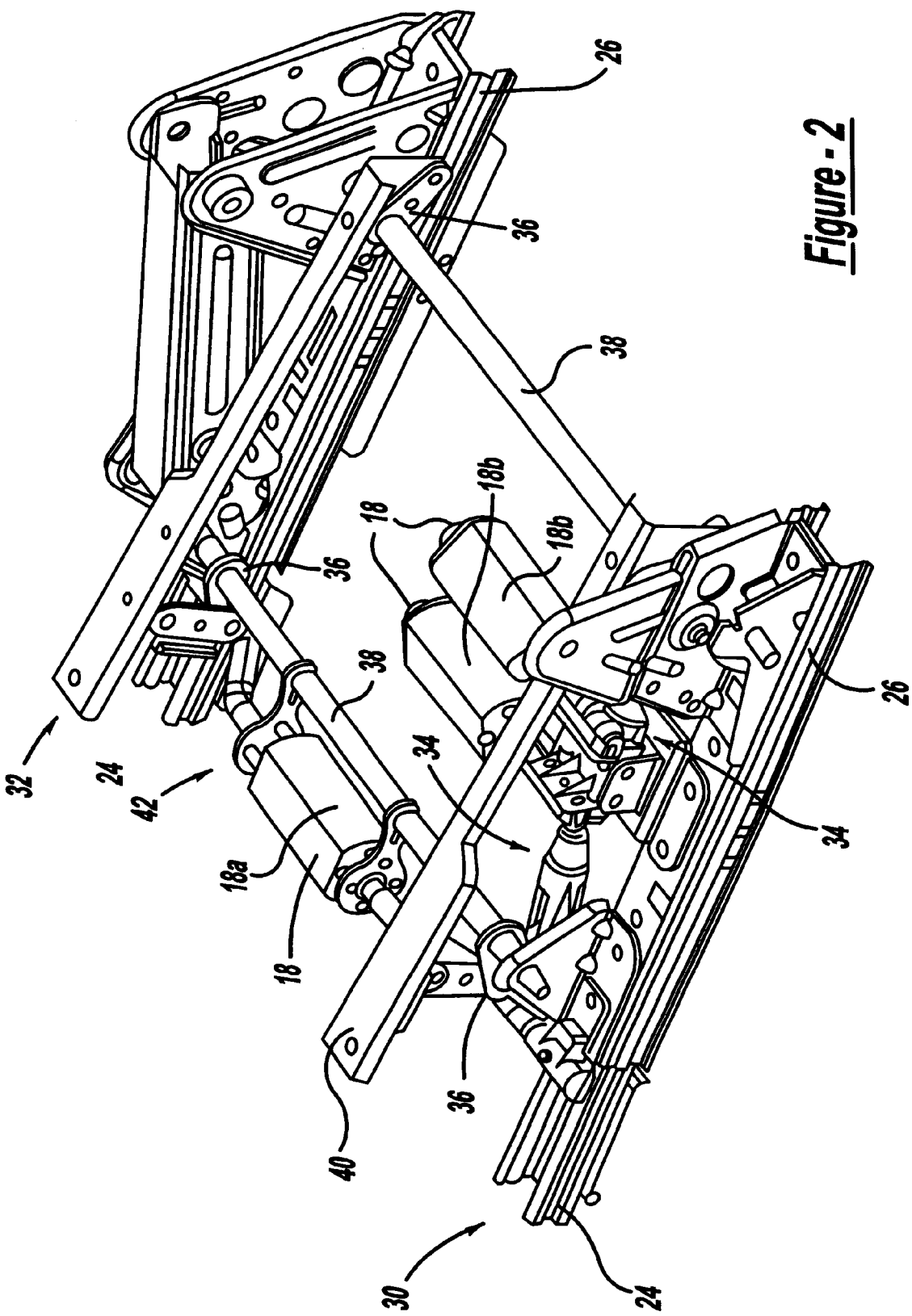
FIG. 2 is a perspective view of a seat adjuster assembly incorporating a flexible shaft for interconnecting the motor and the drive mechanism.

The seat mounting assembly 16 includes a first track 24 that is mounted to the vehicle structure 20 and a second track 26 that slides with respect to the first track 24, as shown in FIG. 2. The seat bottom 12 is supported on the second track 26 for movement with the second track 26 for horizontal seat adjustment, i.e., between forward and rearward positions in the vehicle.

The mounting assembly 16 includes track assemblies on an inboard side 30 and an outboard side 32 of the seat assembly 10. The motors 18 are preferably mounted between the inboard 30 and outboard 32 track assemblies and underneath the seat bottom 12. The terms inboard and outboard are used in this description for clarity and illustration purposes only and cannot be considered limiting.

As discussed above, one motor 18a is used for horizontal seat adjustment and a pair of motors 18b is used for vertical seat adjustment. The vertical adjustment motors 18b are operably connected to vertical drive assemblies, shown generally at 34 in FIG. 2. The vertical drive assemblies 34 control movement of linkages 36. The seat adjuster includes a pair of torque tubes 38 with one tube 38 mounted near the front of the seat 10 and one tube 38 mounted near the rear of the seat 10. The torque tubes 38 extend between the inboard 30 and outboard 32 track assemblies and are connected to a seat pan or seat bottom frame member 40 via linkages 36. One of the vertical adjustment motors 18b drives the front linkages 36 and front torque tube 38 and the other vertical adjustment motor 18b drives the rear linkages 36 and rear torque tube 38.

The horizontal adjustment motor 18a is used to drive a horizontal adjustment assembly 42, shown in FIG. 3. The horizontal adjustment assembly 42 includes a pair of drive mechanisms 44, one each for the inboard 30 and outboard 32 track assemblies, which are connected to the motor 18a by a flexible cable or shaft 46. A conduit member 48 is used to cover each of the shafts 46 to protect the shafts 46 from the external environment. The drive mechanisms 44 can be any type of horizontal drive mechanism known in the art, including a gearbox for driving a threaded drive shaft and drive nut assembly, for example.

Figure 4:
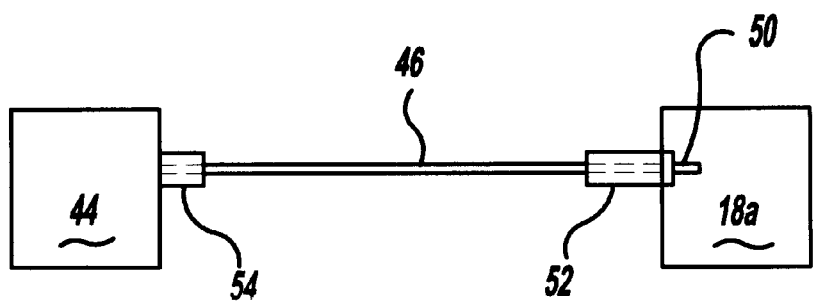
FIG. 4 is a schematic view of the electric motor, drive mechanism, and shaft.

A schematic view of the inboard portion 30 of the horizontal adjustment assembly is shown in FIG. 4. It should be understood that the outboard portion 32 of the horizontal adjustment assembly 42 is similarly designed. The motor 18 has an output 50 such as a drive shaft, which is operably connected to a first connector 52. The drive mechanism 44 has a second connector 54. The drive mechanism 44 is powered by the motor 18 and is adapted for moving the seat 10 between a plurality of adjusted positions.

The flexible shaft 46 is used to interconnect the motor 18 and the drive mechanism 44 via the first 52 and second 54 connectors. Power for seat adjustment is transmitted from the motor 18 to the drive mechanism 44 via the shaft 46. The shaft 46 has a first end portion 56 and a second end portion 58. The first connector 52 and the first end portion 56 are mated together to interconnect the shaft 46 and the motor 18 in an interference fit and the second connector 54 and the second end portion 58 are mated together to interconnect the shaft 46 and the drive mechanism 44 in an interference fit. The interference fit between the connectors 52, 54 and the end portions 56, 58 is tight enough to eliminate undesirable operational noise but still provides for easy assembly. The formation of the interference fit will be discussed in greater detail below.

The first 52 and second 54 connectors are preferably female connectors and the first 56 and second 58 end portions are preferably male members, however, the reverse orientation could also be used. Each of the female connectors 52, 54 define an aperture 60 for receiving the male members 56, 58. Preferably, the aperture 60 and the end portions 56, 58 are rectangular or square in shape. The flexible shaft 46, shown in an unflexed position in FIG. 5, defines a longitudinal axis 62. The male member end portions 56, 58 are defined by a body of rectangular cross-section 64 that is twisted about the longitudinal axis 62. Thus, the body 64 helically formed or spiraled about the axis 62. The body 64 is also twisted with respect to the apertures 60, which are not helically formed.

Figure 6:
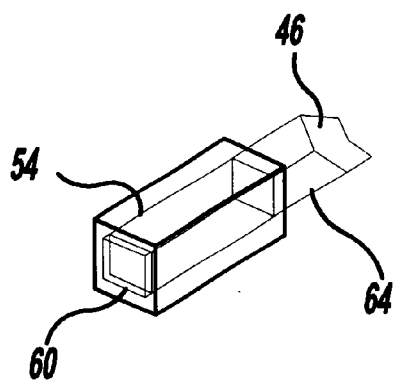
FIG. 6 is a perspective view, partially cut-away, showing the connection of one end of the shaft and a connector from FIG. 5.

The interference fit between the male members 56, 58 and the female members 52, 54 is created due to the interaction between the twisted body 64 of the male members 56, 58 and the non-twisted aperture 60 of the female members 52, 54. This fit is shown in greater detail in FIG. 6. The interference fit eliminates noisy clicking that occurs with conventional shaft connections.

Figure 7:
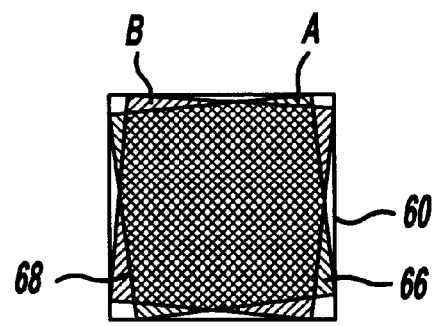
FIG. 7 is a cross-sectional view of the connector and two (2) sections of an end of the shaft with each cross-sectional view superimposed on one another.

The body 64 has a first section 66 (see FIG. 7) taken along line A—A in FIG. 5, which is rotated to a first position about the longitudinal axis 62. The body 64 has a second section 68 taken along line B—B that is rotated to a second position about the longitudinal axis 62. As can be seen in FIG. 7, the second position is at a different rotational orientation with respect to the axis 62 than the first position.

As also shown in FIG. 7, both sections 66, 68 are rotated to positions that are different than the orientation of the aperture 60. The rectangular apertures 60 of the female connectors 52, 54 each define a central axis 70. The cross-sectional area of the aperture 60 remains in a constant orientation with respect to the central axis 70 along the length of the female member 52, 54.

Preferably, the body 64 of the male members 56, 58 are of constant cross-sectional area. However, the bodies 64 could be tapered. Preferably each of the male members 56, 58 include a distal end 72 that has a reduced cross-sectional area. This allows the male members 56, 58 to be easily inserted into the apertures 60.

The helical bodies 64 of the shaft 46 end portions 56, 58 create a slight interference fit with the connectors 52, 54, which have openings 60 that are generally straight with respect to the bodies 64. This unique interface between the shaft 46 and the motor 18 and between the shaft 46 and drive mechanism 44 provides a quiet drive connection while still being easy to assemble.

Preferred embodiments of this invention have been disclosed, however, a worker of ordinary skill in the art would recognize that certain modifications would come within the scope of this invention. For that reason the following claims should be studied to determine the true scope and content of this invention.

We claim:
1. A seat adjuster assembly comprising, in combination:
an electric motor having an output;
a drive mechanism powered by said electric motor and adapted for moving a seat member from a first position to a second position;
a first connector supported by said output;
a second connector supported by said drive mechanism;
a shaft interconnecting said motor and said drive mechanism to transmit power from said motor to said drive mechanism, said shaft including a first end portion and a second end portion wherein said first connector and said first end portion are mated together to interconnect said shaft and said motor in an interference fit and said second connector and said second end portion are mated together to interconnect said shaft and said drive mechanism in an interference fit; and
wherein said first and second connectors are female connectors and said first and second end portions are male members, each of the female connectors defines an opening for receiving one of the male members which has a cross-sectional area remaining in constant orientation with respect to a central axis of the female connectors axis along a pre-determined length of the female connectors, and each of the male members has at least two cross-sections located at different positions along a longitudinal axis of the shaft which have different rotational orientation with respect to the longitudinal axis of the shaft.

2. An assembly as recited in claim 1 wherein each of said female connectors defines a rectangular opening for receiving one of said male members.

3. An assembly as recited in claim 1 wherein said male members are defined by a body of rectangular cross-section that is twisted about said longitudinal axis.

4. An assembly as recited in claim 3 wherein said body has a constant cross-sectional area.

5. An assembly as recited in claim 3 wherein said body has a first section rotated to a first position about said longitudinal axis and a second section rotated to a second position about said longitudinal axis, said second position being different than said first position.

6. An assembly as recited in claim 3 wherein said male members include a distal end having a reduced cross-sectional area.

7. A vehicle seat assembly comprising:
   at least one movable member;
   a seat adjustment mechanism for controlling movement of said movable member;
   an electric motor for driving said seat adjustment mechanism;
   a first connector supported by said motor;
   a second connector supported by said seat adjustment mechanism; and
   a flexible shaft having a first end and a second end with each of said ends defined by a helical body portion wherein said first connector and said first end are mated to interconnect said motor and said shaft and said second connector and said second end are mated to interconnect said seat adjustment mechanism and said shaft.

8. An assembly as recited in claim 7 wherein said first connector has a first cross-sectional shape along a predetermined length defining a first longitudinal axis, said first shape having a constant rotational orientation with respect to said first longitudinal axis along said length and wherein said second connector has a second cross-sectional shape along a predetermined length defining a second longitudinal axis, said second shape having a constant rotational orientation with respect to said second longitudinal axis along said length and wherein each of said ends defines a third longitudinal axis with said helical body portion defined by a first section rotated to a first position about said third longitudinal axis and a second section rotated to a second position, different than said first position, about said third longitudinal axis.

9. An assembly as recited in claim 8 wherein said first and second connectors are female members with said first and second cross-sectional shapes defining rectangular openings and said first and second ends are male members with said helical body portion defined as being rectangular in shape and twisted about said third longitudinal axis.

10. An assembly as recited in claim 7 wherein said first and second connectors are female connectors and said first and second end portions are male members, each of said female connectors defining a rectangular opening for receiving said male members.

11. An assembly as recited in claim 10 wherein said shaft defines a longitudinal axis and wherein said male members are defined by a body of rectangular cross-section that is twisted about said longitudinal axis.

12. A seat adjuster assembly comprising, in combination:
    an electric motor having an output;
    a drive mechanism powered by said electric motor and adapted for moving a seat member from a first position to a second position;
    a first connector supported by said output;
    a second connector supported by said drive mechanism;
    a shaft interconnecting said motor and said drive mechanism to transmit power from said motor to said drive mechanism, said shaft including a first end portion and a second end portion wherein said first connector and said first end portion are mated together to interconnect said shaft and said motor in an interference fit and said second connector and said second end portion are mated together to interconnect said shaft and said drive mechanism in an interference fit;
    wherein said first and second connectors are female connectors and said first and second end portions are male members, each of said female connectors defining a rectangular opening for receiving said male members; and
    wherein said shaft defines a longitudinal axis and wherein said male members are defined by a body of rectangular cross-section that is twisted about said longitudinal axis.

13. An assembly as recited in claim 12 wherein said body has a constant cross-sectional area.

14. An assembly as recited in claim 12 wherein said body has a first section rotated to a first position about said longitudinal axis and a second section rotated to a second position about said longitudinal axis, said second position being different than said first position.

15. An assembly as recited in claim 14 wherein said rectangular openings of said female connectors each define a central axis and wherein the cross-sectional area of said opening remains in a constant orientation with respect to said central axis along a pre-determined length of said connector.

16. An assembly as recited in claim 12 wherein said male members include a distal end having a reduced cross-sectional area.

* * * * *